July 4, 1961

J. W. VAN RIPER 2,990,576

BREAKER PLATE

Filed June 30, 1959

INVENTOR.
JURIAN W. VAN RIPER

BY Alfred W. Vibber

ATTORNEY

July 4, 1961  J. W. VAN RIPER  2,990,576
BREAKER PLATE
Filed June 30, 1959
2 Sheets-Sheet 2
FIG. 7
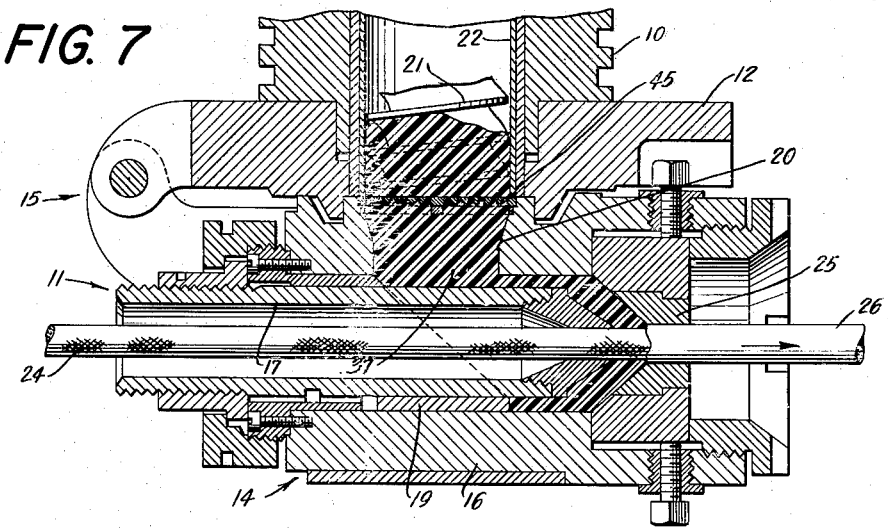
FIG. 8
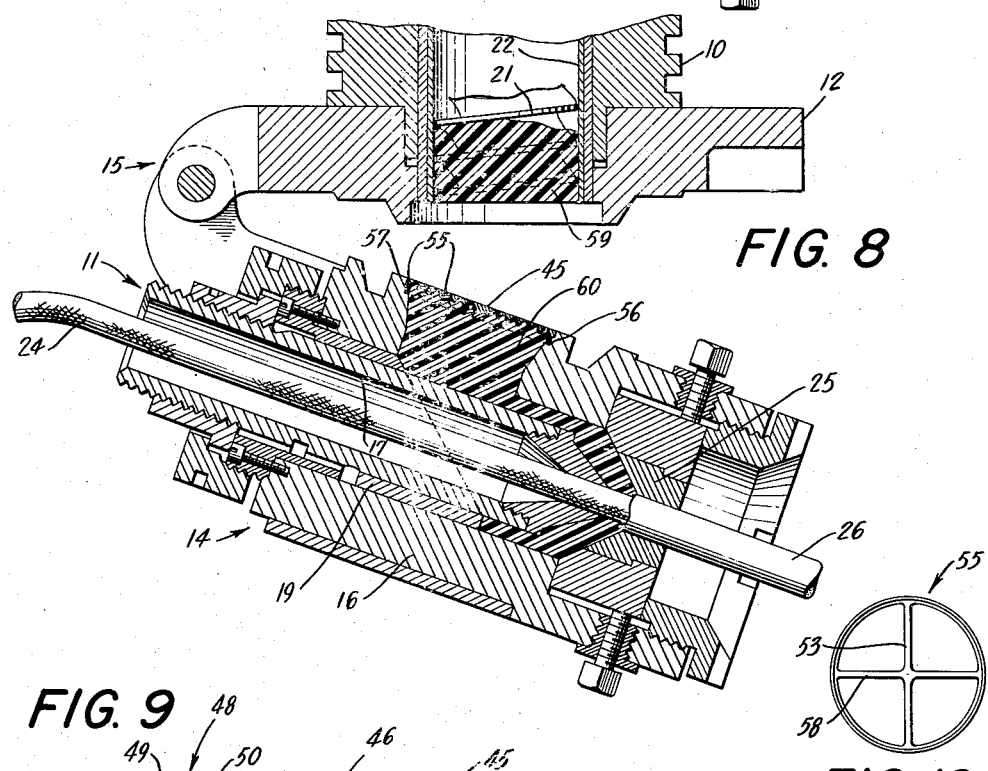
FIG. 9
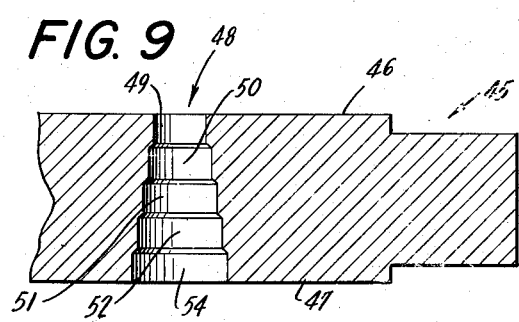
FIG. 10
INVENTOR.
JURIAN W. VAN RIPER
BY Alfred W. Vibber
ATTORNEY ced July 4, 1961

United States Patent Office
2,990,576
BREAKER PLATE
Jurian W. Van Riper, 208 Beechwood Road, Ridgewood, N.J.
Filed June 30, 1959, Ser. No. 824,063
6 Claims. (Cl. 18—12)

This invention relates to plastic material extrusion apparatus, and more particularly relates to plastic material extrusion apparatus including an improved breaker or strainer plate therefor.

This application is a continuation-in-part of application Serial No. 653,377, filed April 17, 1957, and now abandoned.

A breaker plate or strainer for plastic material extrusion apparatus is ordinarily interposed between the die of the extrusion head and the means for delivering plastic material thereto. The breaker plate maintains the plastic material between the plate and the material delivering means under pressure, and plasticizes or homogenizes the plastic material in its passage through the openings in the plate. A plurality of such openings are disposed generally normal to the broad extent of the plate, and are distributed substantially uniformly over the effective area thereof. A conventional breaker plate of the type described is usually provided with a plurality of circular cylindrical passages therethrough. It is very difficult if not impossible to clean such plates, if stiff plastic material is being worked in the extrusion apparatus, other than by machining operations such as by drilling out the holes after the machine has been stopped and the plate removed therefrom. Further, it is quite difficult to remove the plate from the apparatus to allow it to be cleaned.

Breaker plates of the type described are subjected to large mechanical stresses by the plastic material delivered thereto under high pressure. When the passages through the plate are circular cylindrical in configuration, the resulting plate is mechanically weak, because the formation of the passages requires the removal of a large amount of stock therefrom. In addition, a breaker plate with circular cylindrical passages therethrough frequently does not subject the plastic material passing through it to the desired degree of plasticizing and/or homogenizing action.

It is among the objects of the present invention to provide a plastic material extrusion apparatus having in combination a breaker plate of improved construction, such apparatus being characterized by the ease with which the plate may be removed from the extrusion apparatus and the passages therein cleaned of plastic material.

Another object of the invention is the provision of an improved combination of elements, including said novel breaker plate, which is characterized by the improved mixing, homogenizing, and plasticizing action which it exerts upon the plastic material passing therethrough.

The above and further objects of the invention relating to economies of use and manufacture will be more apparent in the following description of a preferred embodiment of the invention. It is to be expressly understood that the illustrative embodiment of the invention is not to be taken as limiting the invention, since the invention is capable of numerous variations, some of which will be pointed out hereinbelow.

Figure 4:
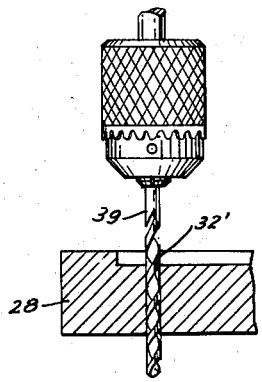
Figure 5:
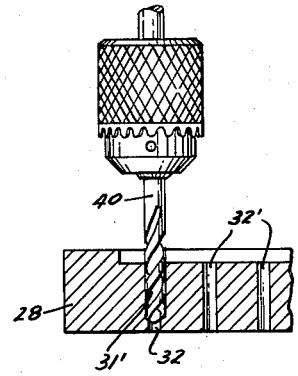
Figure 6:
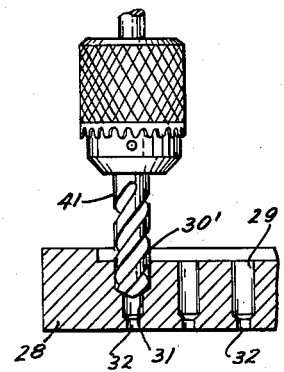

FIGS. 4, 5, and 6 are somewhat diagrammatic views illustrating successive machining steps in a preferred method of formation of the passages through the breaker plate of the invention.

Figure 1:
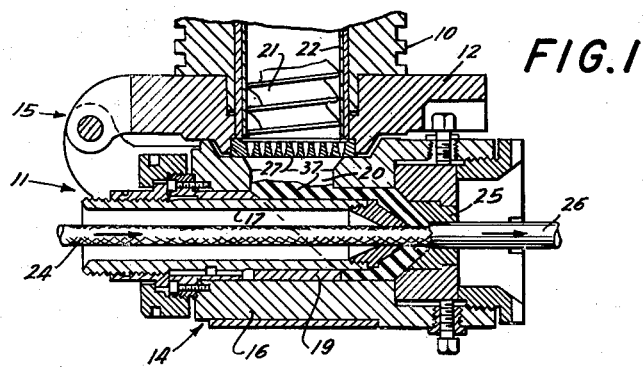
FIG. 1 is a fragmentary view in horizontal section through a first embodiment of cross-head and a portion of an extrusion machine barrel with which the head is employed, the head incorporating a breaker or strainer plate made in accordance with the invention.
Figure 2:
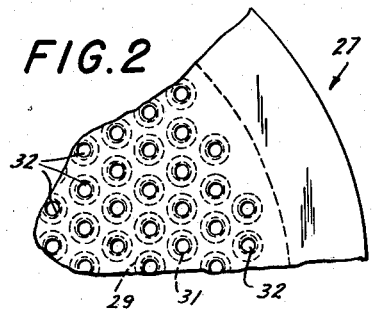
FIG. 2 is an enlarged fragmentary view in bottom plan of the breaker plate shown in FIG. 1.

FIG. 7 is a view generally similar to FIG. 1 of a second embodiment of plastic material extruding apparatus in accordance with the invention.

FIG. 8 is a fragmentary view in horizontal section through the apparatus of FIG. 7 with the head swung into open position, as for the purpose of cleaning the apparatus.

FIG. 9 is a fragmentary view in transverse section through the breaker plate of the apparatus of FIGS. 7 and 8.

FIG. 10 is a view in plan, on a reduced scale, of the filler ring or supporting spider for the breaker plate of the second embodiment of the invention.

Breaker plates made in accordance with the invention are illustrated and described herein as incorporated in cross-heads used to provide a continuous plastic sheath on a core, such as a cable. The breaker plate of the invention may also be used to advantage in straight heads, aligned with the extruding screw of the apparatus, and the apparatus may be used in the extrusion of a variety of shapes such as continuous tubes, bars, rods, sheets, etc.

In the extrusion apparatus shown in FIG. 1, plastic material is supplied by a conventional barrel and screw arrangement. The barrel of the extruding machine is shown fragmentarily at 10, the cross-head generally designated 11 being affixed to the outer end of the barrel. Specifically, the cross-head shown has a first, fixed portion bolted to the barrel, and an active, sheathing portion 14 attached to portion 12 by a hinge generally designated 15, portion 14 being adapted to be held in the operative position of FIG. 1 by studs (not shown).

Portion 14 of the head has a generally part-cylindrical member 16 having a longitudinally extending chamber in the form of a bore therein disposed transversely to the passage 22 in the barrel 10. A core guiding tube 17 is positioned coaxial of the chamber in part 16, there being an outer, plastic material deflecting tube 19 disposed about tube 17 in the chamber. Plastic material 37 is forced under high pressure through the barrel 10 by screws 21 rotatable therein, outwardly through the holes or passages through a breaker plate generally designated 27 disposed across the outer end of screw 21, into guiding passage 20 in the head, and thence into the space within the chamber and the head and forwardly of the forward end of the deflecting tube member 19. The plastic material then flows forwardly into contact with the moving core 24, the resulting sheathed product 26 issuing from the extrusion die 25 in the head.

The breaker plate 27, which is annular disc-like configuration, is retained in a counterbore in part 12 of the head and between such part 12 and the outer part 14 of the head. Breaker plate 27 has a body 28 through the effective central area thereof there extend a plurality of similar passages 29, disposed normal to the broad faces of body 28 and spaced substantially uniformly over the active central portion thereof.

In the embodiment shown, passages 29 are all shown as being identical, each passage 29 being formed of three coaxial circular cylindrical passage portions 30, 31, and 32. Portion 30, shown at the upper or entering side of breaker plate 27, has the largest diameter, the intermediate portion 31 being of somewhat less diameter, and the exit or lower end 32 of the passage having the smallest diameter. Portions 30 and 31 are joined at a downwardly converging frusto-conical zone 34, and portions 31 and 32 are joined by a smaller similar frusto-conical portion 35. In the embodiment shown, the apex angles $\alpha$ and $\beta$ of zones 34 and 35, respectively, are equal.

Plastic material 37, therefore, after leaving the outer end of passage 22 passes through apertures 29 in the breaker plate in the form of small columns 37' of material which are continually being decreased in diameter as they pass through the plate. In their passage through the plate, columns 37' are subjected to marked turbulence, and thus mixing and homogenization as they pass each of the shoulders 34 and 35, and also increase in speed as they progress from one section of the passage to the next, smaller diametered section thereof. The material is therefore maintained in optimum plasticized and homogenized condition as it enters into the chamber of the extrusion head and flows about the core 24.

Not only does the breaker plate of the invention yield a significantly better product by reason of the above described action on the plastic material, but the breaker plate is mechanically stronger as a result of its described construction, so that the plate, for the ordinary conventional sizes of extrusion heads requires no bracings such as struts or bridges abutting its outer face. Such increased strength results from the presence of a markedly greater amount of metal in the zone thereof surrounding passage portions 31 and 32 of the plate. As a result, the breaker plate of the invention is markedly stronger than a conventional one in which the passages have a diameter generally equal to the diameter of the largest portion 30 of the present plate. Thus the breaker plate allows a greater flow area within a given diameter at the screen while maintaining the plate of adequate strength.

The cleaning of an extrusion head and also the breaker plate of an apparatus incorporating the breaker plate of the invention is more readily carried out than with conventional breaker plates. When it is desired to clean the disclosed apparatus of the invention, the driving means for screw 21 is stopped, the studs holding the outer portion 14 of the head to fixed portion 12 are removed, and portion 14 is swung away from portion 12 about hinge 15. This results in breaking the run or length of plastic material in passage 20. Such breaking of the plastic material takes place at a location somewhat outwardly of but close to the outer face of breaker plate 27, at which the smallest diametered portions 32 of the passages through the breaker plate are located. The breaker plate 27 remains in its seat in fixed portion 12 of the head. The plastic material which remains on the outer face of such plate is then sheared off flush with such face, after which, by reason of the stepped construction of the passages 29 in the breaker plate, the breaker plate may be readily pried out of its seat in portion 12 of the head. During such removal and pulling outwardly of plate 27, the plastic material columns 37' are given sufficient pull generally longitudinally thereof to attenuate them so that they pull free from the surfaces of the stepped portions of the passage. Thus the breaker plate may now be readily removed, and the plate requires little if any additional cleaning since the columns 37' usually remain attached to and integral with the portion of the plastic material in passage 22 above the upper face of the breaker plate.

Figure 3:
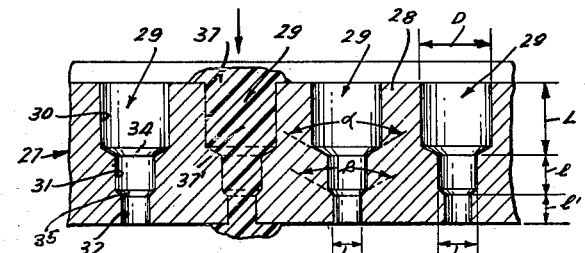
FIG. 3 is an enlarged fragmentary sectional view through the breaker plate of the invention, plastic material being shown in one of the passages through the plate, the other passages being shown empty for ease of illustration.

Ordinarily, in the practice of the invention, it is preferred that the depth of each portion of the passage, shall not exceed the diameter of such portion of the passage. In the typical breaker plate 27, shown in FIG. 3, the diameter D of the largest portion 30 of passage 29 slightly exceeds the length L thereof. The diameter d of passage portion 31 slightly exceeds the length l thereof, and the diameter d' of portion 32 of the passage somewhat exceeds the length of l' thereof. Such construction assures that the breaker plate may be readily removed in the manner described above even when the apparatus is working upon the relatively stiffer plastic materials. It is also preferred that the angles $\alpha$ and $\beta$, while being fairly large, shall be much less than 180°. In the preferred embodiment shown in FIG. 3, both such angles are shown as being 120°.

In FIGS. 4, 5, and 6 there are shown successive steps in a preferred method of making a breaker plate in accordance with the invention. After the requisite number of passages to be formed have been spotted or scribed upon one face of the block or plate 28 to form the breaker plate, a plurality of correctly spaced cylindrical bores 32' are formed therein normal to the basis of the plate, as by use of a small drill 39 having a diameter corresponding to portion 32 of passage 29. Such operation is diagrammatically shown in FIG. 4. Next, the intermediate portion of passages 29 are formed as by the use of a drill 40 having a diameter equal to that of portion 31 of the passage, drill 40 being advanced into plate 28 from the upper face thereof to the requisite depth to form the lower shoulder 35. Since the tips of conventional drills have an apex angle of 120, such drilling operation automatically forms the shoulder 35 of the desired configuration. Such operation is shown in FIG. 5. Finally, as depicted in FIG. 6, the upper largest portions 30 of the passages are formed by a drill 41 which is advanced into each of the previously formed passages 29' to such depth as to locate shoulder 34 in the desired location.

The described manner of formation of breaker plate 27, as can be seen, is rapidly and economically carried out. Such method requires only the use of conventional drills, and once the drill quills or spindles have been set to drill to the proper depth, the drilling operation may be carried out in a routine manner.

Simply by way of illustration, and not limitation, the following example is given of a breaker plate such as that shown at 27 made in accordance with the invention. The plate, which has an effective central portion confronting passage 22 of 4½" diameter, is provided with 100 passages 29 therethrough. The effective central portion of the plate has a total thickness of ⅝". The larger entry portion 30 of each passage 29 has a diameter of ¼" and a depth L of ¼". Intermediate portion 31 has a diameter d of 7/32", and a depth l of 3/16". The smallest, exit portion 32 of passages 29 has a diameter of 3/16", and a depth l' of 3/16".

A second embodiment of plastic material extruding apparatus made in accordance with the invention is shown in FIGS. 7–10, inclusive, wherein parts which are the same as those shown in FIGS. 1–6, inclusive, are designated by the same reference characters. The principal differences between the two embodiments are the employment of a breaker plate of different configuration in the second embodiment, and the use of a different manner of mounting of the breaker plate on the head, whereby the breaker plate remains on the movable portion of the extrusion head when the head is opened, as shown in FIG. 8.

In FIGS. 7, 8, and 9 the breaker plate is designated 45. Plate 45 has a large number of substantially equally spaced holes or passages 48 therethrough, such holes being distributed over four equal quadrants separated by narrow diametral webs, as shown. As mounted in the head, breaker plate 45 has its face 46, shown as the upper face in FIG. 9, facing the end of the screw 21 in FIG. 7, and its opposite face 47, shown as the lower face in FIG. 9, facing passage 20 in the cross-head 11 of the apparatus.

As breaker plate 45 is positioned in the extruding apparatus, the plastic material entering the cross-head flows in the direction from the smaller-diametered end 49 of each of passages 48 toward the larger-diametered end 54 of such passages. In the embodiment shown, there are five steps 49, 50, 51, 52, and 54 in each of passages 48, such steps being smoothly graduated in diameter. Preferably each step is circular cylindrical, and is connected to its neighbor or neighbors by frusto-conical zones. The passages 48 may conveniently be formed by drilling, as in the case of the first-disclosed embodiment, there being employed five drills of appropriate diameters in forming the respective steps 49, 50, etc.

The breaker plate 45 is supported in a seat 57 on the movable portion of the extruding head, the plate 45 being backed up by a filler plate or spider 55 which fits within a seat 56 positioned outwardly of seat 57 in the movable portion of the extruding head. Spider 55, shown more clearly in FIG. 10, has two diametrically disposed webs 53 and 58 disposed at right angles to each other. The webs of the spider underlie the imperforate web portions, above described, of the breaker plate 45.

When it is desired to clean the extruding apparatus, the screw is stopped, pressure within the extruding head is relieved, and the movable portion of the head is released and swung outwardly to the position of FIG. 8. When this is done, the plastic material within the barrel and the head of the extruding machine breaks generally as shown in FIG. 8, leaving a portion 59 remaining in the barrel and a portion 60 remaining in the head. The line of break lies somewhat outwardly of but close to the face 46 of breaker plate 45 at which the smaller ends 49 of passages 48 are located. The plastic material remaining in the barrel is thus immediately exposed for cleaning. The plastic material in the cross-head may easily be exposed by shearing off the plastic material remaining on face 46 of the breaker plate 45, and then prying plate 45 and spider 55 out of their seats. The disposition of the portions of passages 48 so that they increase in diameter from face 46 to face 47 allows the plastic material in the passages readily to elongate slightly, as the plate 45 is thus pried, and to pull free of the walls of the passages. The breaker plate may thus readily be removed, substantially no separate cleaning of plastic material from the passages in the plate being required.

Simply for the sake of illustration, and not by way of limitation, there are given herewith the dimensions of a typical breaker plate 45.

The breaker plate has an over-all diameter of 20.25 inches, a thickness of ⅝ inches, and has a total of 1704 passages 48 therethrough. The passages 48 are made up of five sections 49, 50, etc., each of ⅛ inch length, and having diameters, respectively, of 7/32, ¼, 9/32, 5/16, and 11/32 inches in the direction from section 49 to section 54 of passage 48.

Although for purposes of illustration there have shown and described preferred embodiments of breaker plate in accordance with the invention incorporated in a cross-head for the sheathing of a continuous core, and there have shown and described a preferred method of making such breaker plates, it is to be understood that the apparatus in accordance with the invention are not limited thereto. Thus the number of steps in the passage in the breaker plate may be varied appreciably, as may be the relative diameters of successive steps, within the teaching of the invention. Further, the breaker plate may be formed in other ways, which may involve making the plate in finished form as by casting or the like, or by machining or removing metal from either an imperforate blank plate or a partially formed blank. The invention is, therefore, to be defined primarily by the scope of the claims appended hereto.

Although in the embodiment shown the passages in the breaker plate have been shown as lying parallel to each other in the illustrative embodiments, in some instances, particularly where the delivery passage into the head is of smaller diameter than the passage in the screw barrel, it is desirable to have the passages in the breaker plate converge from the entrance to the exit end thereof. In such construction the passages will lie within a frustum of a cone which converges toward the exit end of the plate.

What is claimed is:

1. In an apparatus for extruding plastic material in solid plastic form comprising a means for forwarding plastic material under pressure, an extruding head having a chamber and a die for shaping the plastic material as it issues from the chamber, and a breaker plate interposed between the plastic material forwarding means and the chamber, the improved breaker plate having a plurality of passages therethrough distributed over its effective area, said passages having coaxial major portions progressively stepped in diameter from a larger diameter adjacent a first face of the breaker plate to a smaller diameter adjacent the second face of the breaker plate, the successive major portions of the walls of the passages being circular cylindrical and decreasing in length from the first to the second face of the breaker plate, the second face of the breaker plate confronting the plastic material supporting means.

2. Extrusion apparatus as claimed in claim 1, wherein the zones of juncture between the successive major portions of the walls of the passage are in the form of frustums of cones flaring toward the first face of the breaker plate.

3. In an apparatus for extruding plastic material in solid plastic form comprising a means for forwarding plastic material under pressure, an extruding head having a chamber and a die for shaping the plastic material as it issues from the chamber, and a breaker plate interposed between the plastic material forwarding means and the chamber, the improved breaker plate having a plurality of passages therethrough distributed over its effective area, said passages having at least three coaxial major portions progressively stepped in diameter from a larger diameter adjacent a first face of the breaker plate to a smaller diameter adjacent the second face of the breaker plate, the successive major portions of the walls of the passages being circular cylindrical and decreasing in length from the first to the second face of the breaker plate.

4. In an apparatus for extruding plastic material in solid plastic form comprising a means for forwarding plastic material under pressure, an extruding head having a chamber and a die for shaping the plastic material as it issues from the chamber, and a breaker plate interposed between the plastic material forwarding means and the chamber, the improved breaker plate having a plurality of passages therethrough distributed over its effective area, said passages having coaxial major portions progressively stepped in diameter from a larger diameter adjacent a first face of the breaker plate to a smaller diameter adjacent the second face of the breaker plate, the successive major portions of the walls of the passages being circular cylindrical and having diameters all of which somewhat exceed the axial lengths of the respective major portions of the walls of the passages.

5. In an apparatus for extruding plastic material in solid plastic form comprising a means for forwarding plastic material under pressure, an extruding head having a chamber and a die for shaping the plastic material as it issues from the chamber, and a breaker plate interposed between the plastic material forwarding means and the chamber, the improved breaker plate having a plurality of passages therethrough distributed over its effective area, said passages having at least three coaxial major portions progressively stepped in diameter from a larger diameter adjacent a first face of the breaker plate, confronting the plastic material forwarding means, to a smaller diameter adjacent the second face of the breaker plate, the successive major portions of the walls of the passages being circular cylindrical and decreasing in length from the first to the second face of the breaker plate.

6. Extrusion apparatus as claimed in claim 5, wherein the zones of juncture between the successive major portions of the walls of the passages are in the form of frustrums of cones flaring toward the first face of the breaker plate.

References Cited in the file of this patent

UNITED STATES PATENTS

| | | |
|---|---|---|
| 2,507,311 | Lodge | May 9, 1950 |
| 2,760,230 | Van Riper | Aug. 28, 1956 |
| 2,766,479 | Henning | Oct. 16, 1956 |
| 2,861,319 | Breen | Nov. 25, 1958 |

FOREIGN PATENTS

| | | |
|---|---|---|
| 947,488 | France | Jan. 10, 1949 |
| 428,436 | Italy | Dec. 19, 1947 |
| 250,624 | Switzerland | June 16, 1948 |

UNITED STATES PATENT OFFICE
CERTIFICATE OF CORRECTION

Patent No. 2,990,576                       July 4, 1961

Jurian W. Van Riper

It is hereby certified that error appears in the above numbered patent requiring correction and that the said Letters Patent should read as corrected below.

Column 6, line 20, for "supporting" read -- forwarding --.

Signed and sealed this 14th day of November 1961.

(SEAL)
Attest:

ERNEST W. SWIDER                       DAVID L. LADD
Attesting Officer                        Commissioner of Patents

USCOMM-DC